United States Patent
Sugiura et al.

(10) Patent No.: US 6,826,475 B2
(45) Date of Patent: Nov. 30, 2004

(54) CAR NAVIGATION UNIT

(75) Inventors: Wataru Sugiura, Anjo (JP); Daisuke Manabe, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/451,273

(22) PCT Filed: Nov. 27, 2002

(86) PCT No.: PCT/JP02/12402

§ 371 (c)(1),
(2), (4) Date: Jun. 20, 2003

(87) PCT Pub. No.: WO03/046481

PCT Pub. Date: Jun. 5, 2003

(65) Prior Publication Data

US 2004/0044464 A1 Mar. 4, 2004

(30) Foreign Application Priority Data

Nov. 30, 2001 (JP) .................... 2001-366536

(51) Int. Cl.⁷ ............................................. G06F 17/00
(52) U.S. Cl. ................... 701/210; 340/988; 340/995; 342/357.08
(58) Field of Search ............................ 701/200, 209, 701/224, 211, 213, 208, 210; 345/700; 340/995, 988, 990, 995.1; 342/357.08

(56) References Cited

U.S. PATENT DOCUMENTS

| | | | | |
|---|---|---|---|---|
| 5,793,631 A | 8/1998 | Ito et al. | ...................... | 340/990 |
| 5,931,888 A | * 8/1999 | Hiyokawa | .................... | 701/208 |
| 5,944,768 A | * 8/1999 | Ito et al. | ..................... | 701/200 |
| 6,285,950 B1 | * 9/2001 | Tanimoto | .................... | 701/201 |
| 6,351,707 B1 | * 2/2002 | Ichikawa | .................... | 701/209 |
| 6,581,001 B1 | * 6/2003 | Katsuka et al. | ............. | 701/209 |
| 6,618,669 B2 | * 9/2003 | Ota et al. | .................... | 701/208 |

FOREIGN PATENT DOCUMENTS

| | | |
|---|---|---|
| JP | A-9-159476 | 6/1997 |
| JP | A-9-325041 | 12/1997 |
| JP | A-2000-193478 | 7/2000 |
| JP | A-2001-280988 | 10/2001 |

* cited by examiner

Primary Examiner—Thomas G Black
Assistant Examiner—Tuan C To
(74) Attorney, Agent, or Firm—Posz & Bethards, PLC

(57) ABSTRACT

When in a guide route a vehicle has strayed from a route r1 before passing through an en-route stop W and has moved onto a route r2 selected to lead to a destination E after the en-route stop, if a distance L from a present position of the vehicle to the en-route stop W is below a predetermined value d, travel guidance to the destination E is continued. Conversely, if the distance L from the present position to the en-route stop W is above the predetermined value d, a guide route leading to the destination via the en-route stop W is reset, and the guide route is therefore not switched to the route r2.

7 Claims, 5 Drawing Sheets

CAR NAVIGATION UNIT

TECHNICAL FIELD

The present invention relates to a car navigation unit for providing route guidance from a present position to a destination via a set desired en-route stop, and particularly relates to processing of the car navigation unit in a case where the vehicle has strayed from a guide route.

BACKGROUND ART

Car navigation units of related art normally have a function for detecting a present position, a function for, when a destination is inputted, searching for a guide route from the present position to the destination and the like. And while the vehicle is traveling, the guide route obtained by the searching and the present position of the vehicle are displayed on a display screen to provide route guidance.

Among car navigation units of this kind there are some with which, when a search for a route to a destination is carried out, to make it possible to set a course wished for by the driver, it is possible to input en-route stops. With a car navigation unit like this, when an en-route stop is inputted, a search for a route passing through this en-route stop is carried out, and consequently at times such as when the driver wants to make a stop en route or make a detour, or wants to set a route which passes through a desired location, this wish can be fulfilled.

In a car navigation unit with which it is possible to set en-route stops, when as shown in FIG. 7 a searched guide route R intersects with itself, it sometimes happens that at this intersection point C, due to the road to be traveled being mistaken or due to location error, the present position jumps from a route r1 leading to an en-route stop W to a route r2 of after passing through the en-route stop W. In this case, with a car navigation unit of related art, because it is inferred that a route change has been made and a switch is made to guidance for the route r2 of after passing through the en-route stop W, it becomes impossible to go to the en-route stop W.

In particular, when as shown in FIG. 8 the vehicle leaves an expressway H to call at an en-route stop W, enters the expressway H again through the same interchange as when it left the expressway H to go to the destination, the situation has often arisen due to location error that it is inferred that there has been a change from the route r1 leading to the en-route stop W to the route r2 of after passing through the en-route stop W, and the guide route is wrongly switched to the route r2.

This is because when a vehicle leaves an expressway H and enters an exit ramp of an interchange, since the branching angle of the exit ramp with respect to the expressway H is small, notwithstanding that the vehicle has left the expressway H and entered the exit ramp, it is readily determined due to location error that the vehicle is still traveling on the expressway H. And when it has been determined that the vehicle is traveling on the expressway H, it is assumed to have changed to the route r2 of after passing through the en-route stop W, and a switch is made to guidance for the route r2.

The present invention was made in view of the situation described above, and an object thereof is to provide a car navigation unit with which even when before passing through an en-route stop the present position has entered a guide route of after passing through that en-route stop, the guide route can to the utmost be prevented from being switched to the route of after passing through the en-route stop, and even if it has been so switched, it is to the utmost made possible to go to the en-route stop.

DISCLOSURE OF THE INVENTION

To achieve the object described above, in a car navigation unit according to the invention, when in a guide route the vehicle has strayed from a route of before passing through an en-route stop and moved onto a route leading to a destination of after passing through the en-route stop, if the distance from the present position of the vehicle to the en-route stop is below a predetermined value, travel guidance to the destination without passing through the en-route stop is carried out. According to this, even when travel guidance is carried out to the destination without passing through the en-route stop, because the distance from the present position to the en-route stop is a short distance below a predetermined value, if the driver wants to go the en-route stop, for example they can go to the en-route stop by looking at a map displayed on a display screen, and so even without route guidance there is no problem.

If, when in a guide route the vehicle has strayed from a route of before passing through an en-route stop and moved onto a route leading to a destination of after passing through the en-route stop, the distance from the present position to the en-route stop is above the predetermined value, it is desirable for a guide route leading to the destination via the en-route stop to be reset. By this means, the vehicle can be guided to the destination via the en-route stop because the guide route is not switched to the route of after passing through the en-route stop.

When in a guide route there is a point where guide routes of before and after an en-route stop is passed through intersect, at that intersection point it can be determined whether or not the vehicle has left the guide route of before the en-route stop is passed through and moved onto the guide route leading to the destination of after the en-route stop is passed through.

And, the above-mentioned predetermined value can be made the straight-line distance from the present position of the vehicle to the en-route stop. Also, when an en-route stop can be set by selecting from a telephone number, an address, a name of an establishment, or any point on a map displayed on display means, a construction may be adopted such that size of the predetermined value is set in correspondence with the en-route stop selection means.

BEST MODE FOR CARRYING OUT THE INVENTION

An embodiment of the invention will now be described on the basis of FIG. 1 through FIG. 6.

Figure 1:
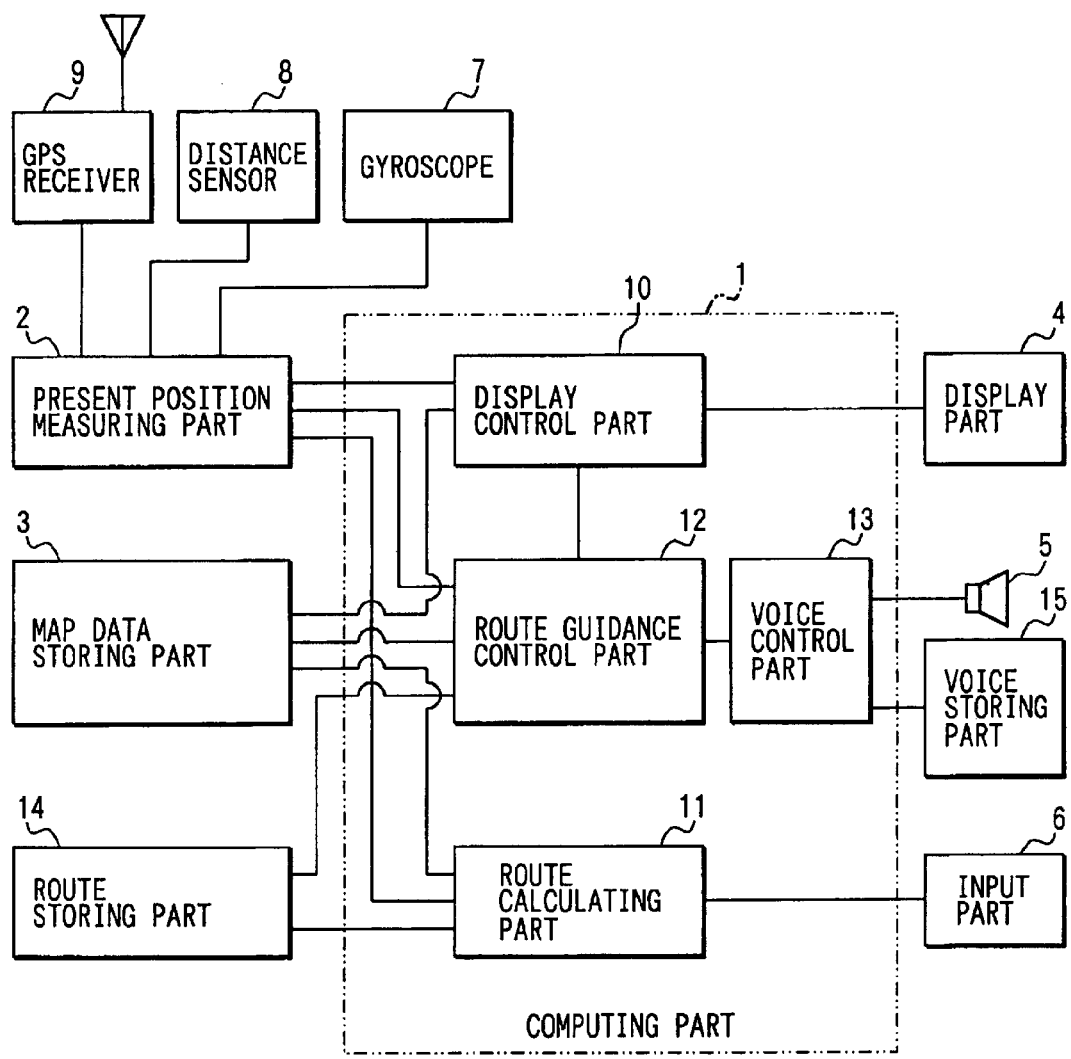
FIG. 1 is a block diagram showing functionally the overall construction of a car navigation unit according to an embodiment of the invention.

FIG. 1 is a block diagram showing functionally the overall construction of a car navigation unit. As shown in the figure, the car navigation unit has a computing part 1, a present position measuring part 2 constituting position detecting means, a map data storing part 3 constituting map data storing means, a display part 4 constituting display means, a speaker 5 constituting audio means, and an input part 6.

A gyroscope 7, a distance sensor 8 and a GPS (Global Positioning System) receiver 9 are connected as sensors to the present position measuring part 2. Because these sensors 7 through 9 each have detection errors with different properties, these sensors 7 through 9 are combined in order to enable them to mutually correct detection errors and perform highly accurate position detection. The present position measuring part 2 determines a present position of the vehicle on the basis of the detection results of these sensors 7 through 9.

The map data storing part 3 is made up of an information storing medium such as for example a DVD-ROM and a reading device for reading map data from this information storing medium, and the reading device reads map data, map matching data and data for providing route guidance with voice and gives this to the computing part 1. In the map data there is data appended with link numbers given to sections set to divide each road, and the sections can be specified by means of these link numbers.

The display part 4 has a display screen such as for example a liquid crystal display, and map data, text and symbols can be displayed on this display screen. The input part 6 is used for inputting data and inputting various set parameters and for example is made up of various switches such as touch switches or mechanical switches provided integrally with the display part 4.

The computing part 1 has a display control part 10, a route calculating part 11, a route guidance control part 12 and a voice control part 13. The display control part 10 acquires present position information from the present position measuring part 2 and displays on the display screen of the display part 4 a road map of the vicinity of this present position on the basis of map data acquired from the map data storing part 3, and also displays a pointer indicating the present position and forward direction of the vehicle superimposed on the road map on the display screen.

The route calculating part 11 functions as guide route searching means and sets a guide route from the present position to a destination. When an en-route stop has been designated, the route calculating part 11 sets a guide route which passes through that en-route stop. En-route stops and destinations are inputted through the input part 6, which serves as en-route stop setting means and destination setting means. For the inputting of an en-route stop or a destination in this case a method can be selected from among for example a method whereby it is designated as any point on a map displayed on the display screen of the display part 4, a method whereby it is designated by inputting a place name or the like, and a method whereby it is designated with a telephone number or the name of an establishment.

When an en-route stop and a destination are set through the input part 6, on the basis of map data in the map data storing part 3 the route calculating part 11 searches for a guide route from the present position to the destination or a guide route from the present position leading to the destination through the en-route stop, and stores this guide route in a route storing part 14. As the method for searching for the guide route, a known method such as the Dijkstra Method is used.

The route guidance control part 12, which functions as route guiding means and route control means, reads out a guide route stored in the route storing part 14 and displays that guide route on a road map on the display part 4 by way of the display control part 10. And, the route guidance control part 12 acquires the present position from the present position measuring part 2, and, when the vehicle approaches a junction where it should change direction, displays the name of the junction and the distance to the junction on the display screen of the display part 4 by way of the display control part 10. Also, along with the display of the junction name and the distance to the junction, the route guidance control part 12 issues an instruction to the voice control part 13 to give direction guidance at the junction with voice.

On the basis of instructions from the route guidance control part 12 the voice control part 13 reads out information stored as digital data in a voice storing part 15 and converts this into an analog signal and drives a speaker 5. By this means, route guidance is carried out by direction instructions such as "Turn * at the junction approximately * * * m ahead." being given with voice from the speaker 5.

When a guide route has been set, the route guidance control part 12 detects whether or not the present position of the vehicle is on that guide route, and when it has strayed from the guide route, issues a route resetting instruction to the route calculating part 11. When the route calculating part 11 receives a route resetting instruction, it newly sets a guide route from the present position to the destination or a guide route from the present position to the destination via the en-route stop, and stores the new guide route in the route storing part 14 in place of the original guide route.

Figure 3:
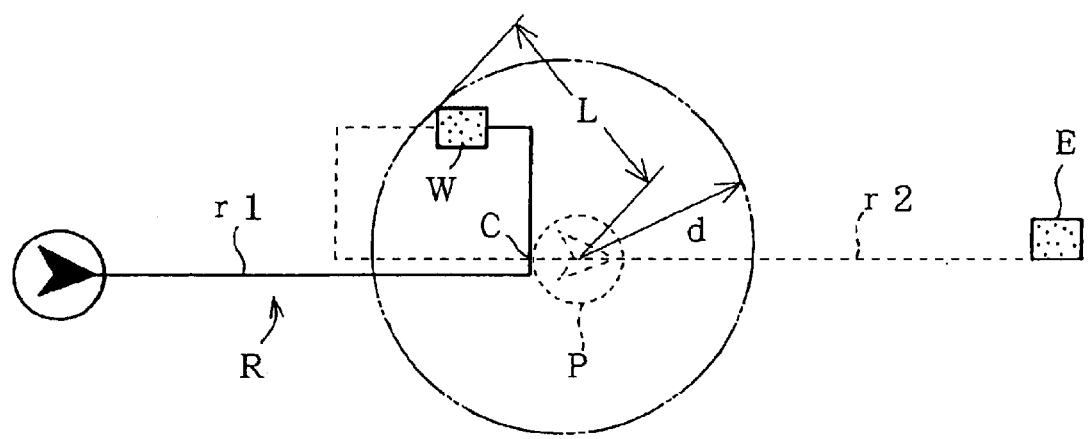
FIG. 3 is an explanatory view showing a state of having strayed from a route.
Figure 5:
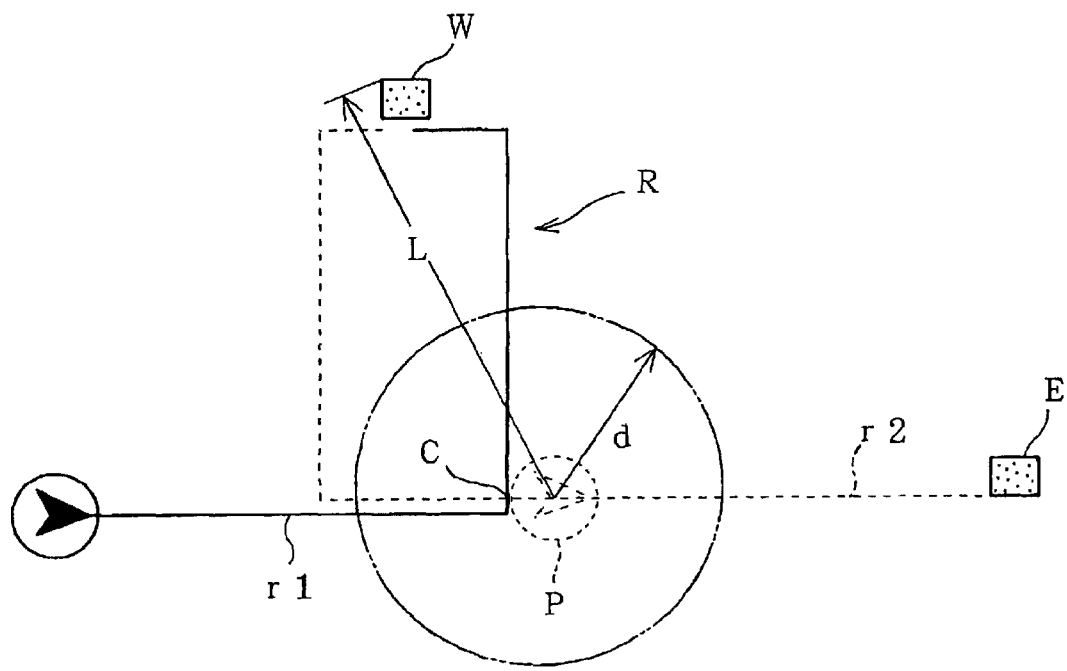
FIG. 5 is an explanatory view showing another state of having strayed from a route.

Now, in the case of a guide route with an en-route stop set therein, it sometimes happens that during travel on the route guiding to the en-route stop, due to location error relating to the present position or the like, the vehicle jumps to the route of after the en-route stop has been passed through. This route-jumping occurs readily when, as shown in FIG. 3 and FIG. 5, the guide route R has an intersection point. The guide route R in FIG. 3 and FIG. 5 has one en-route stop W, and a route r1 guiding to this en-route stop W and a route r2 guiding to the destination E after the en-route stop W has been passed through intersect in one place. When there is an intersection C in the guide route R like this, it sometimes happens that the driver mistakes the direction at this intersection C and goes from the route r1 into the route r2.

In this case, as determining means the route guidance control part 12 determines whether or not the vehicle has gone from the route r1 into the route r2. And when it determines that the vehicle has gone from the route r1 into the route r2, in correspondence with the straight-line distance from the present position to the en-route stop, the route guidance control part 12 either provides guidance for continually traveling along the guide route or newly sets a guide route from the present position to the en-route stop.

Figure 2:
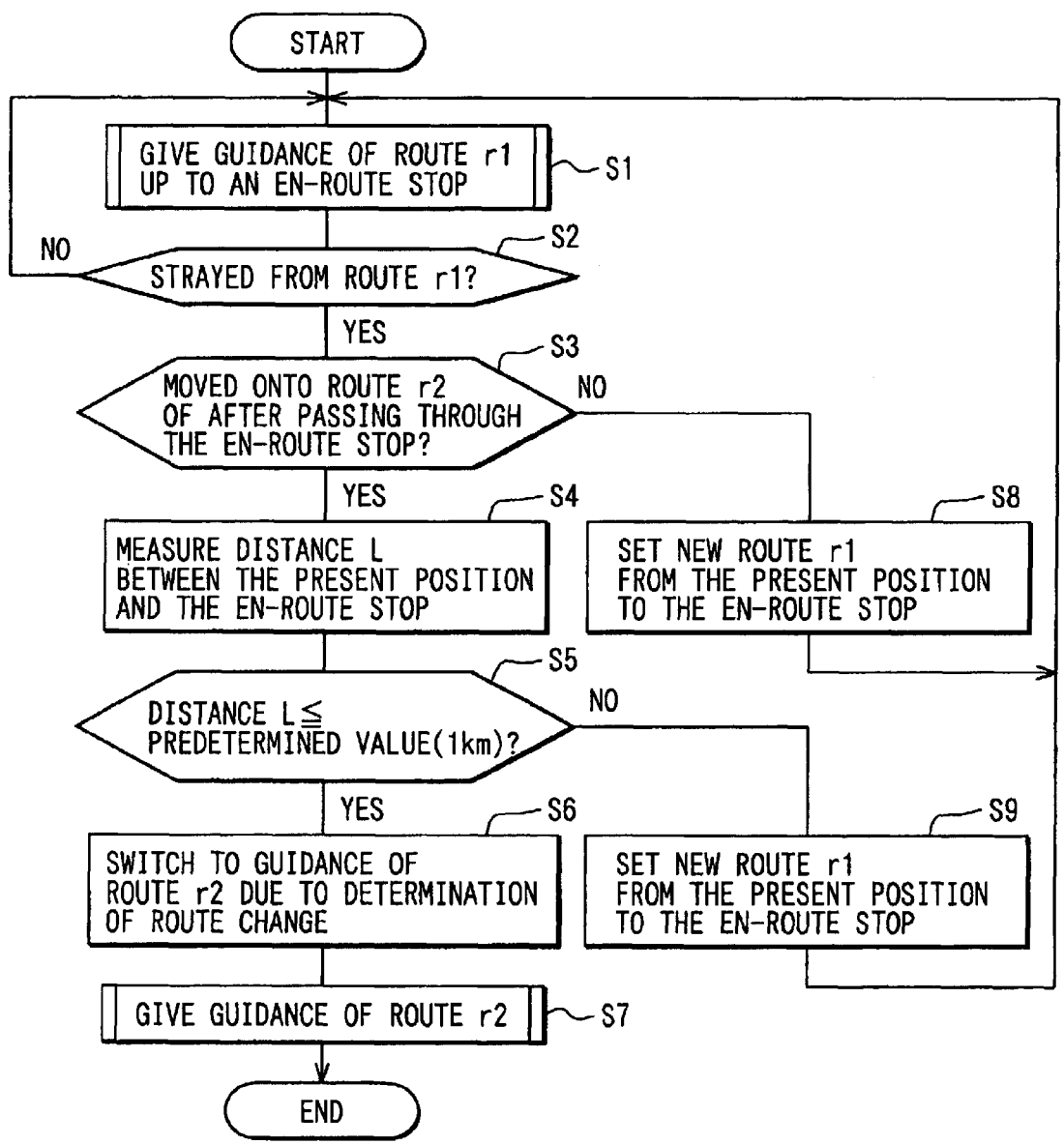
FIG. 2 is a flow chart showing content of route guidance.

Control carried out in this case where the vehicle has jumped from part-way along the route r1 to part-way along the route r2 will now be described, with reference to the flow chart of FIG. 2.

When an en-route stop W and a destination E have been set, and on the basis of these the route calculating part 11 has set a guide route R, the route guidance control part 12, first, gives direction guidance for the vehicle to travel from a departure point to the en-route stop W along a route r1 (step S1). Then, during this route guidance, the route guidance control part 12 determines whether or not the vehicle has strayed from the route r1 (step S2), and when it has not ("NO" in step S2), returns to step S1 and continues direction guidance for the route r1. The determination of whether or not the vehicle has strayed from the route r1 is carried out by comparison of the present position and the route r1.

As ways in which the present position of the vehicle may leave the route r1, there are the case of going from part-way along the route r1 into the route r2 due to a direction mistake or a location error or the like, and the case of going from the route r1 into a road other than the route r2, again due to a direction mistake or a location error or the like.

In this connection, the route guidance control part 12, when the present position of the vehicle has left the route r1 ("YES" in step S2), supposing that it has left the route r1 due to a direction mistake, next determines whether or not the present position has moved onto the route r2 (step S3: entry determining means). When at this time the vehicle has left the route r1 and entered a road other than the route r2 ("NO" in step 3), the route guidance control part 12 issues a route resetting instruction to the route calculating part 11. The route calculating part 11 newly sets a guide route r1 from the present position to the en-route stop W (to here, step S8), and the route guidance control part 12 gives direction guidance to the en-route stop W on the basis of this new guide route r1 (step S1).

When straying from the route r1 takes place at the intersection C between the route r1 and the route r2 and the present position of the vehicle has moved onto the route r2, as shown in FIG. 3 and FIG. 5 ("YES" in step S3), the route guidance control part 12 measures the distance L from the present position to the en-route stop W (step S4: distance measuring means). Then, the route guidance control part 12 determines whether or not the distance L from the present position to the en-route stop W is not more than a predetermined value d, for example 1 Km (step S5). Note that a circle of a radius of the predetermined length (1 Km) from the present point maybe drawn, and whether or not the distance L from the present position to the en-route stop W is below the predetermined value d then determined on the basis of whether or not the en-route stop W is within this circle.

Figure 4:
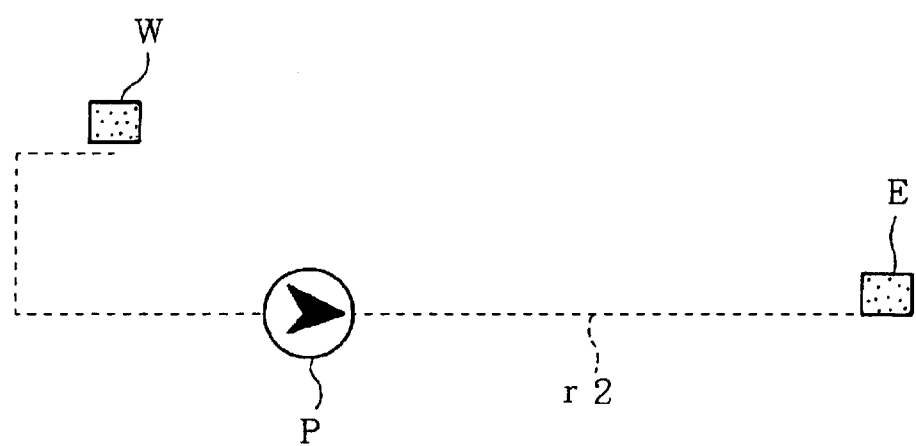
FIG. 4 is an explanatory view showing a guide route of when the state of having strayed from a route in FIG. 3 has been deemed a route change.

In this case, as shown in FIG. 3, when the distance L between the present position P and the en-route stop W is below the predetermined value d ("YES" in step S5), the route guidance control part 12 determines that it is a route change, as shown in FIG. 4, and eliminates the route r1 and switches to guidance for the route r2 of after the en-route stop W is passed through (step S6). Thereafter, the route guidance control part 12 guides the course of the vehicle along the route r2 (step S7), and ends route guidance when the vehicle reaches the destination.

Figure 6:
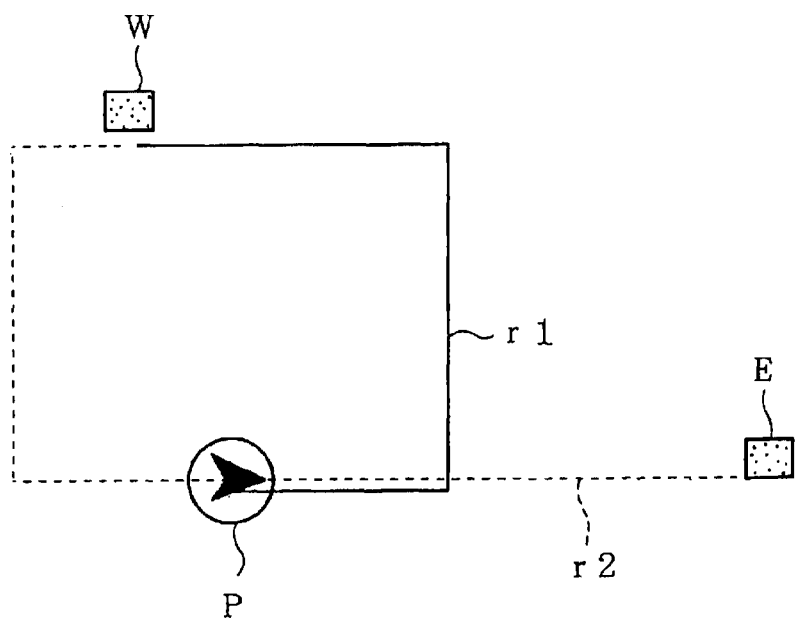
FIG. 6 is an explanatory view showing a guide route of when the state of having strayed from a route in FIG. 5 has been deemed not a route change.
Figure 7:
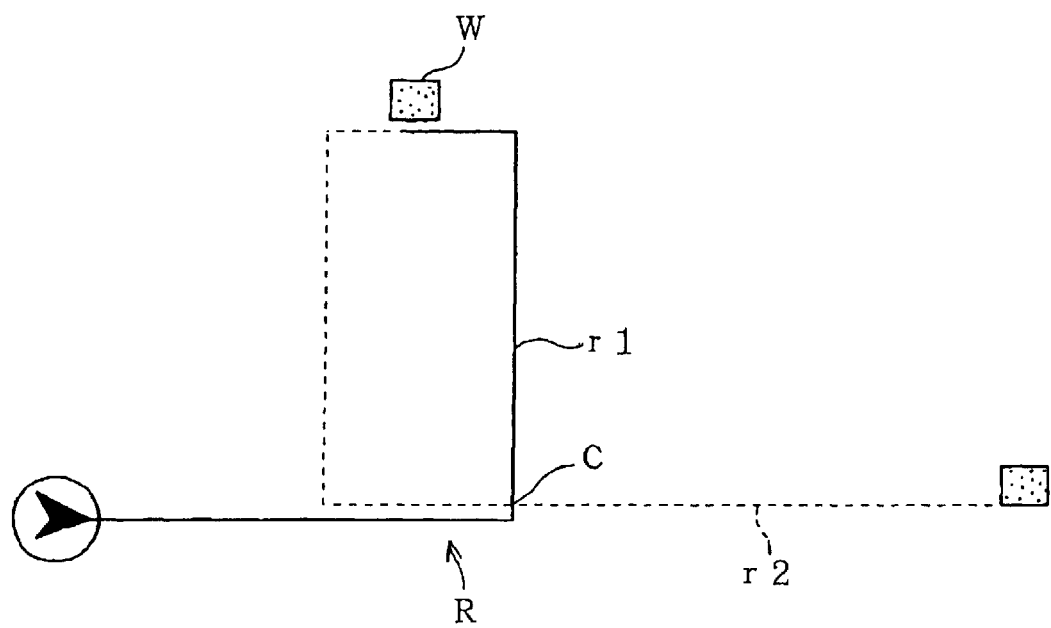
FIG. 7 is an explanatory view for illustrating a problem of when straying from a route has arisen in related art.
Figure 8:
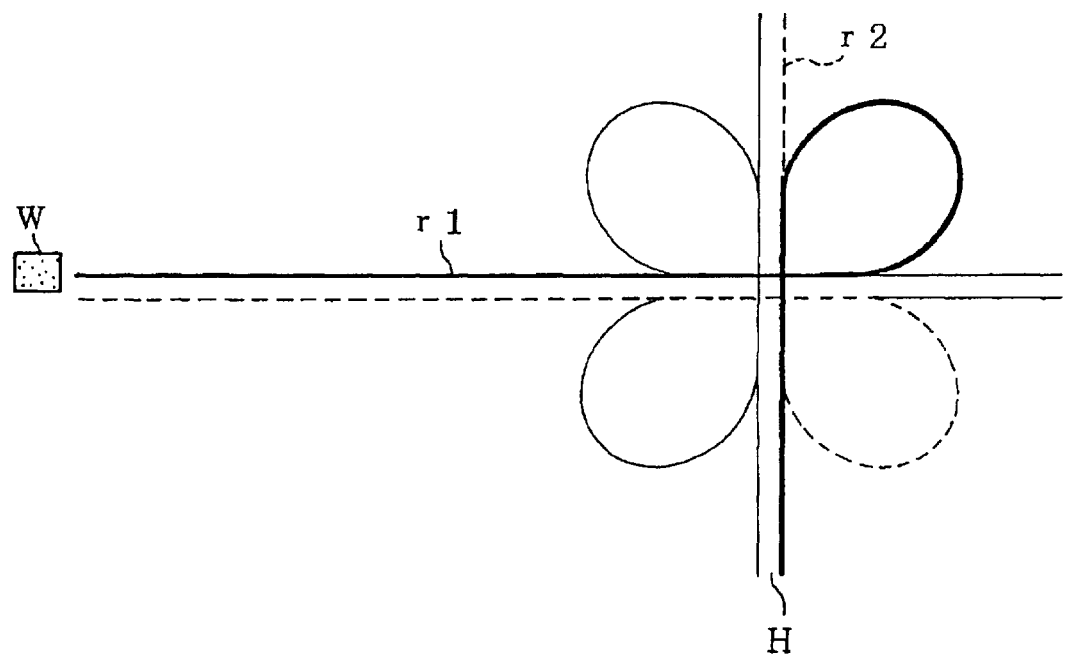
FIG. 8 is an explanatory view showing another example of straying from a route in related art.

And, as shown in FIG. 5, when the distance L from the present position P to the en-route stop W exceeds the predetermined valued (1 Km) ("NO" in step S5), the route guidance control part 12 determines that it is not a route change, and as in step S8, sets anew guide route r1 from the present position P to the en-route stop W, as shown in FIG. 6 (step S9). After that, the route guidance control part 12 returns to step S1, and thereafter executes the operation described above and provides direction guidance for the vehicle to follow the route r1, after which it executes direction guidance along the route r2 and then ends route guidance when it reaches the destination E.

Incidentally, when due to a location error it has been determined that the vehicle has strayed from the route r1, notwithstanding that the vehicle is actually traveling on the route r1, after a new route is set in step S8 or step S9, it is determined by map matching processing that the vehicle is traveling on the original route r1, and consequently in step S3 the determination becomes "NO" and in step S9 a route to the en-route stop W is set again (often the same as the original route r1).

Thus with this embodiment, even when a change from part-way along the route r1 to the route r2 is inferred, if the distance from the present position to the en-route stop W exceeds a predetermined distance, a guide route from the present position to the en-route stop W is newly set. Accordingly, the problem of guidance to the en-route stop W not being provided due to the inference of a route change can to the utmost be resolved.

If the distance from the present position to the en-route stop W was below a predetermined value (1 Km) when it was determined that a change to the route r2 had been made, a new guide route to the en-route stop W is not set. However, because it is not far (below 1 Km) from the present position to that en-route stop W, it is possible to go to the en-route stop W easily by following the map displayed on the display screen of the display part 4, and consequently there is no problem.

This invention is not limited to the embodiment described above and shown in the figures, and the following changes and expansions are possible.

When it is determined that a route change has been made, the distance d between the present position and the en-route stop, which constitutes the reference for whether or not a new guide route from the present position to the en-route stop is set, is not limited to 1 Km. Also, this distance d is not limited to a straight-line distance, and may alternatively be a road distance from the point of leaving the route r1 to the en-route stop W.

And, the distance d may be changed in correspondence with the setting method of the en-route stop W. For example, when the en-route stop W is specified with a telephone number, an establishment name or an address, because the en-route stop W is set with pinpoint precision, in this case the distance d is made short, and when the en-route stop W is designated as any point on a map displayed on the display screen of the display part 4, because this is a rough designation, in this case, the distance d is set long.

Between the departure point and the destination there may be a plurality of en-route stops. In this case, the "route of after passing through the en-route stop" in the "when at part-way along the route leading to the en-route stop it has left that route and jumped to a route of after passing through the en-route stop" appearing in claim 1 includes a route of after passing through an en-route stop passed through after said en-route stop, and the "en-route stop" of the "distance from the present position to the en-route stop" refers to the en-route stop to which the vehicle is guided by the route it has been traveling up to now.

And, whereas in the embodiment described above a point set before the final destination is called an "en-route stop", this is synonymous with "point to be passed through" and "intermediate destination" and so on, and as long as it is a point set as a point for a guide route to go via (pass through), various expressions can be used.

Although in the embodiment described above a case wherein a guide route going via an en-route stop intersects with itself before and after the en-route stop was described, the invention is not limited to this. That is, it can of course be applied also in a case where a guide route does not intersect with itself but does come close to itself before and after an en-route stop, and the vehicle has left the guide route before passing through the en-route stop and immediately moved onto the guide route of after passing through the en-route stop.

INDUSTRIAL APPLICABILITY

Because, as described above, a car navigation unit according to the invention can carry out route guidance suitably even when a route to an en-route stop and a route from that en-route stop to a destination come close to each other, it will be utilized suitably as a car navigation unit with which it is possible to set en-route stops.

What is claimed is:

1. A car navigation unit having a function for carrying out travel guidance of a vehicle according to a guide route which reaches a destination through a set en-route stop, the car navigation unit comprising:

determining means for determining whether or not said vehicle has strayed from a guide route of before passing through said en-route stop and moved onto a guide route leading to a destination of after passing through said en-route stop; and guiding means for carrying out travel guidance to said destination without passing through said en-route stop if a distance from a present position of said vehicle to said en-route stop is below a predetermined value, when said determining means determines that said vehicle has strayed from said guide route of before passing through said en-route stop and moved onto said guide route leading to said destination of after passing through said en-route stop.

2. A car navigation unit having a function for carrying out travel guidance of a vehicle according to a guide route which reaches a destination through a set en-route stop, the car navigation unit comprising:

determining means for determining whether or not said vehicle has strayed from a guide route of before passing through said en-route stop and moved onto a guide route leading to a destination of after passing through said en-route stop; and guiding means for carrying out travel guidance according to a guide route reset to lead to said destination via said en-route stop if a distance from a present position of said vehicle to said en-route stop is above a predetermined value, when said determining means determines that said vehicle has strayed from said guide route of before passing through said en-route stop and moved onto said guide route leading to said destination of after passing through said en-route stop.

3. A car navigation unit having a function for carrying out travel guidance of a vehicle according to a guide route which reaches a destination through a set en-route stop, the car navigation unit comprising:

determining means for determining whether or not said vehicle has strayed from a guide route of before passing through said en-route stop and moved onto a guide route leading to a destination of after passing through said en-route stop; and guiding means for carrying out travel guidance to said destination without passing through said en-route stop if a distance from a present position of said vehicle to said en-route stop is below a predetermined value, and carrying out travel guidance according to a guide route reset to lead to said destination via said en-route stop if a distance from a present position of said vehicle to said en-route stop is above a predetermined value, when said determining means determines that said vehicle has strayed from said guide route of before passing through said en-route stop and moved onto said guide route leading to said destination of after passing through said en-route stop.

4. A car navigation unit comprising:

map data storing means for storing map data;

destination setting means for setting a desired destination;

en-route stop setting means for setting a desired en-route stop in a route leading to said destination;

searching means for searching, on a basis of said map data, for a guide route which reaches said destination through said set en-route stop;

present position detecting means for detecting a present position of a vehicle;

control means for determining that the guide route is changed after passing through said en-route stop and switching guidance to a route of after passing through said en-route stop if a distance from the present position of said vehicle to said en-route stop is below a predetermined value, and for determining that the vehicle does not pass through said en-route stop and newly setting a guide route from said present position to said en-route stop without switching said guidance to the route of after passing through said en-route stop if the distance from the present position of said vehicle to said en-route stop is above the predetermined value, when, in said guide route, said vehicle strays from part-way along a route leading to said en-route stop and moves onto a route of after passing through said en-route stop.

5. A car navigation unit recited in any one of claims 1 to 4, characterized in that, in said guide route, there is a point where guide routes of before and after passing through said en-route stop intersect with each other, said determining means determines whether or not the vehicle strays from the guide route of before passing through the en-route stop and moved onto the guide route leading to the destination of after passing through said en-route stop at said intersection point.

6. A car navigation unit recited in any one of claims 1 to 4, wherein said predetermined value is a straight-line distance from the present position of said vehicle to said en-route stop.

7. A car navigation unit recited in any one of claims 1 to 4, characterized in that said en-route stop can be set by selecting from at least a telephone number, an address, a name of an establishment, and any point on a map displayed on display means, and size of said predetermined value is set in correspondence with the en-route stop selection means.

* * * * *